Figure 1:
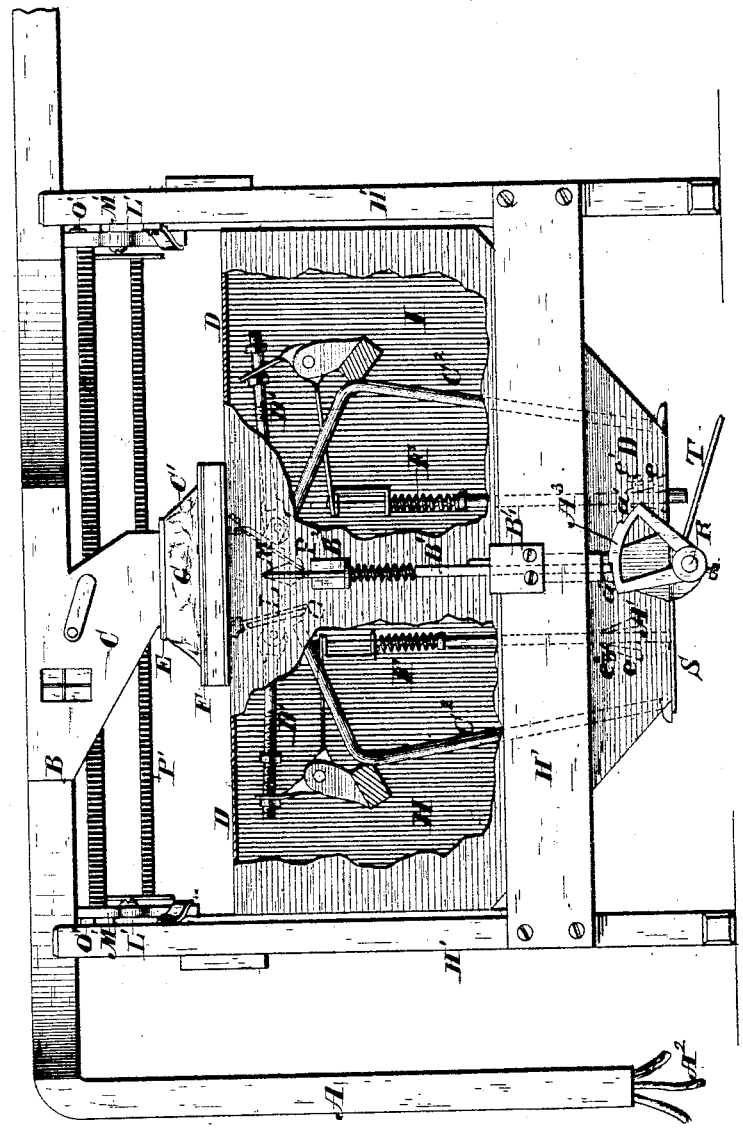

5 Sheets—Sheet 1.

J. B. STONER.
Pneumatic Grain-Elevator.

No. 218,595. Patented Aug. 12, 1879.

Attest:
J. Henry Kaiser.
J. A. Rutherford

Inventor:
John B Stoner
By James L. Norris,
Atty.

N. PETERS, PHOTO-LITHOGRAPHER, WASHINGTON, D. C.

J. B. STONER.
Pneumatic Grain-Elevator.

No. 218,595. Patented Aug. 12, 1879.

Attest:
J. Henry Kaiser.
J. A. Rutherford

Inventor:
John B. Stoner
By James L. Norris.
Atty.

J. B. STONER.
Pneumatic Grain-Elevator.

No. 218,595. Patented Aug. 12, 1879.

Attest:
J. Henry Kaiser.
J. A. Rutherford

Inventor:
John B. Stoner.
By James L. Norris.
Atty.

UNITED STATES PATENT OFFICE.

JOHN B. STONER, OF TOLEDO, OHIO.

IMPROVEMENT IN PNEUMATIC GRAIN-ELEVATORS.

Specification forming part of Letters Patent No. 218,595, dated August 12, 1879; application filed June 25, 1879.

*To all whom it may concern:*

Be it known that I, JOHN B. STONER, of Toledo, in the county of Lucas and State of Ohio, have invented certain new and useful Improvements in Pneumatic Grain-Elevators, of which the following is a specification.

This invention relates to an improved pneumatic grain-elevator, and it has for its object to convey the grain by means of atmospheric pressure acting directly upon it from any point, and automatically deliver it to one or more receptacles without intermediate handling, whereby a great saving of machinery is effected, and a continuous flow of grain from point to point may be secured.

To this end the invention consists, first, in a pneumatic tube extending from the point of supply to the point of delivery, provided with a suitable screen, and connected with suitable air-exhausting apparatus, by means of which the air may be exhausted from the tube, so that the pressure of the external air will force the grain upward from the point of supply to the point of delivery and discharge it into a suitable hopper, as more fully hereinafter specified; second, in the combination, with the pneumatic tube, of a hopper having two compartments and connected to the pneumatic tube at its delivery-point by means of an air-tight flexible connection, the said compartments being provided with suitable valves and mechanism for operating the same, whereby the grain may be alternately delivered to and discharged from said compartments, as more fully hereinafter specified; third, in the combination, with the pneumatic conveying-tube and the receiving-hopper, of a movable screen which may be brought into an inclined position, whereby the grain may be delivered to said hopper, or directed to one or more additional hoppers, as more fully hereinafter specified; fourth, in the combination, with the grain-receiving hopper and the upper and lower alternately-acting valves, of one or more air-tubes in each compartment of the hopper, adapted to admit and discharge a current of air alternately against the upper valves in the respective compartments, whereby the induction-valve of each compartment will be closed as the eduction-valve is opened, as more fully hereinafter specified; fifth, in the combination, with the upper and lower alternately-acting valves for admitting the grain to the respective compartments of the hoppers, of suitable levers operated by the lower valves to automatically open the upper valves and admit the grain to each compartment of the hopper, as more fully hereinafter specified; sixth, in combination with a grain-conveying pneumatic tube, a rising-and-falling hopper, an air-tight flexible connection between said tube and hopper, and devices for latching and unlatching, or opening and closing, a valve or valves of said hopper, said devices being operated or permitted to operate by the rising and falling of the hopper, substantially as hereinafter set forth; seventh, in the combination, with the hopper, of a pneumatic tube, the transverse area of which from the point of delivery to the exhaust is larger than the transverse area of said tube from the point of supply to the point of delivery, whereby a thorough exhaust is insured and the grain is rapidly elevated; eighth, in an improved method of attaching the pneumatic tube to the hopper by means of a flexible connection, whereby the hopper is permitted to rise and fall without destroying the vacuum, as more fully hereinafter set forth.

Figure 2:
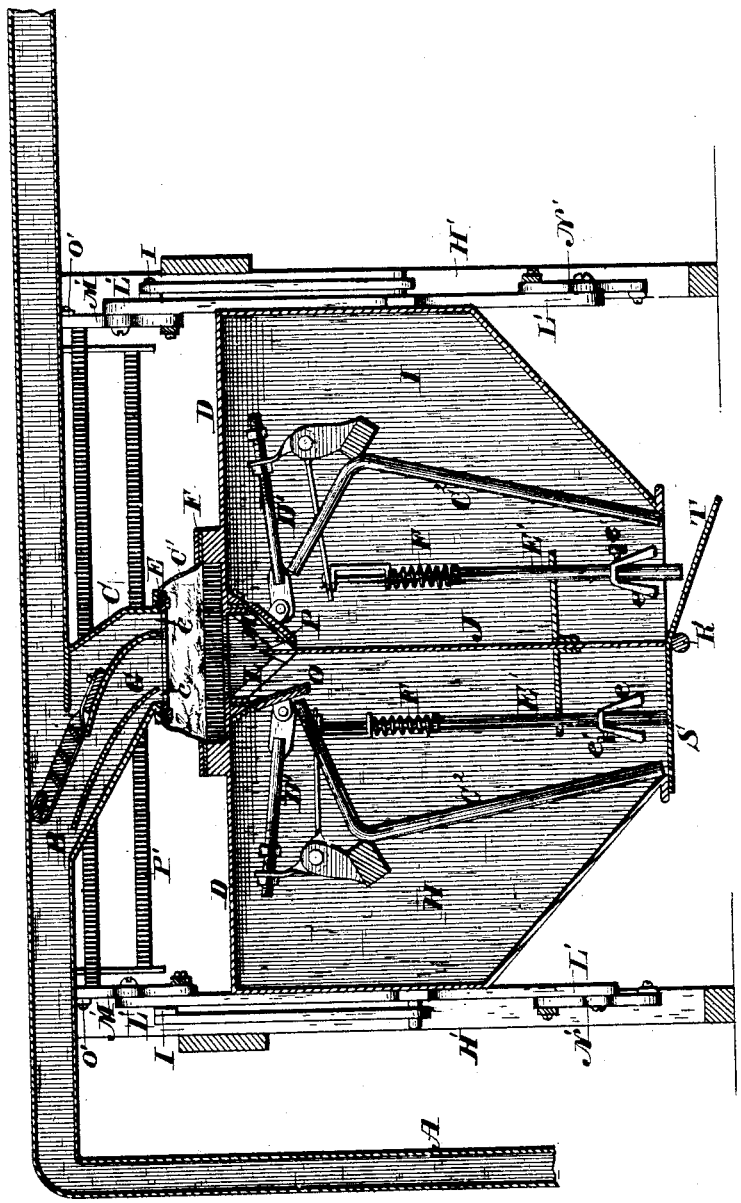
Figure 3:
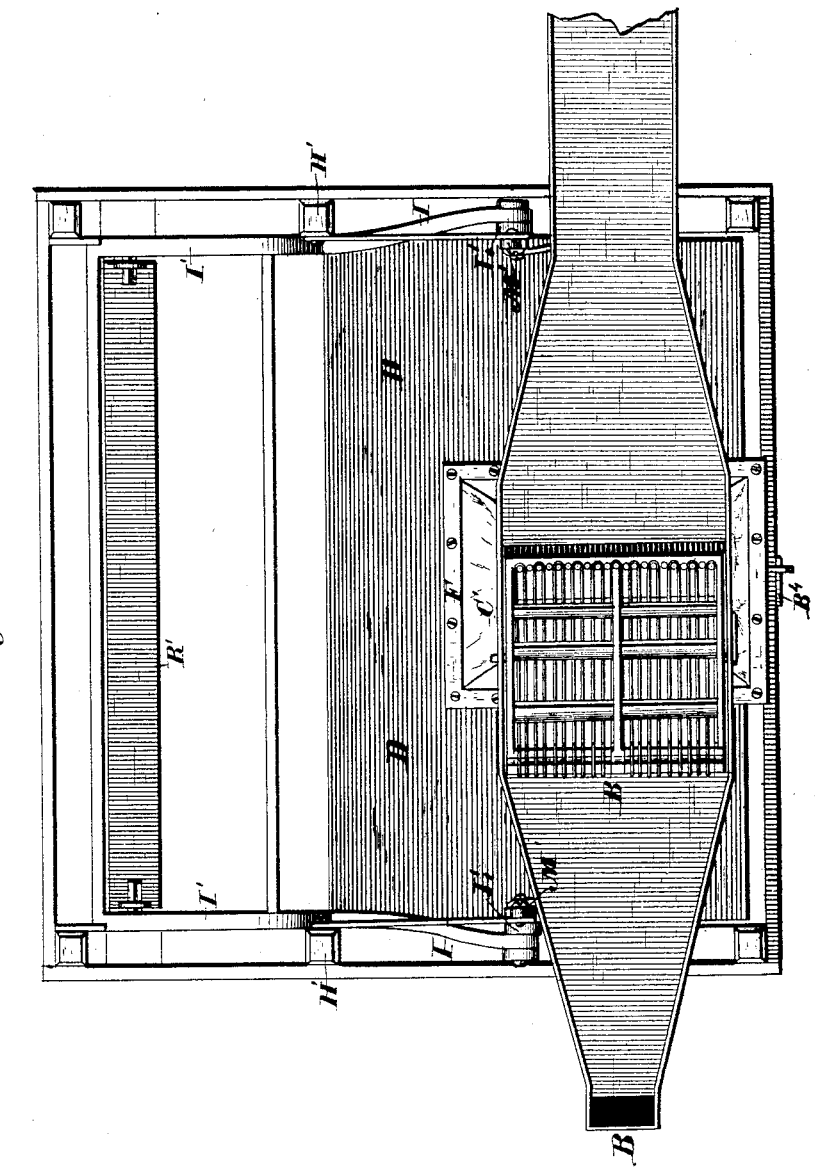
Figure 4:
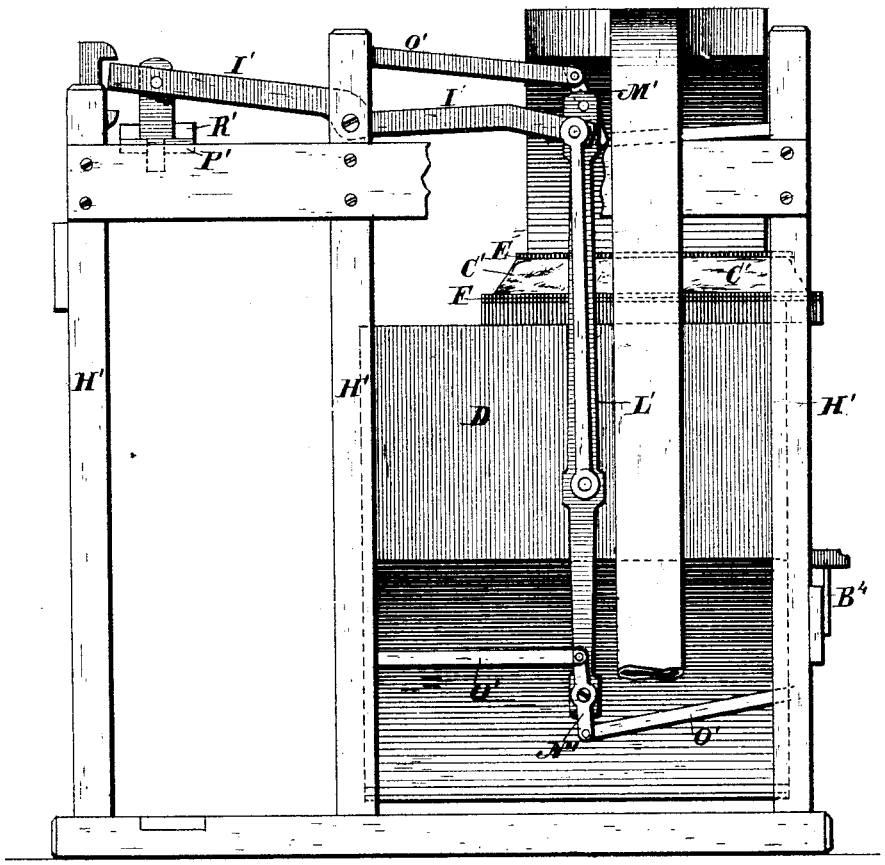
Figure 5:
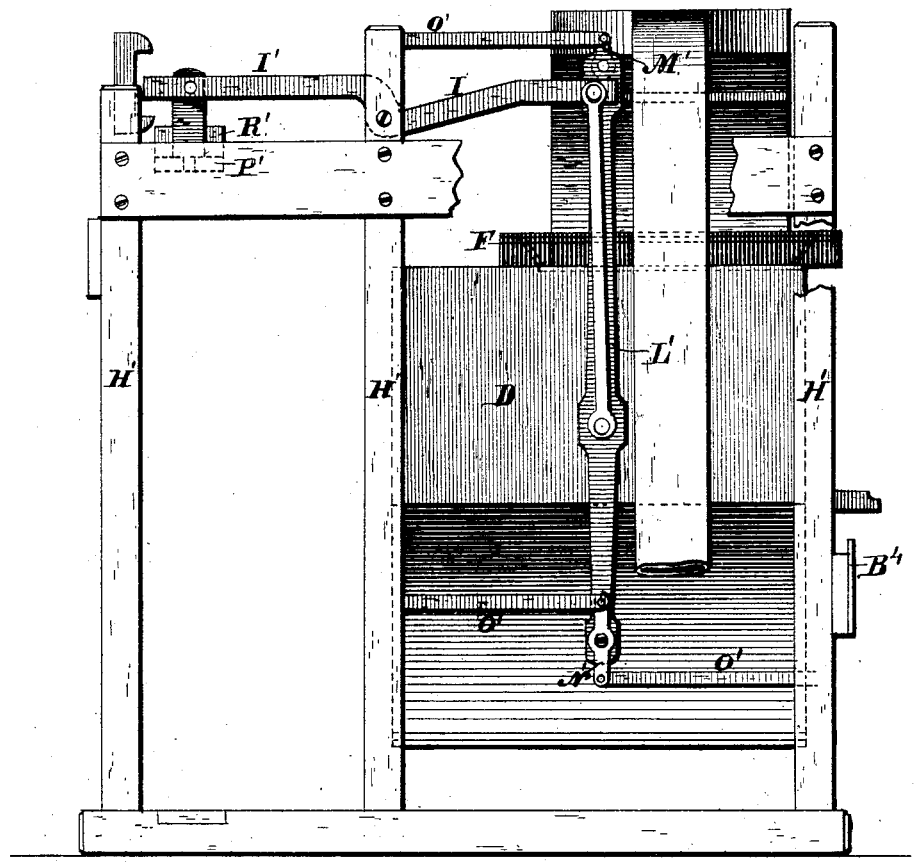

In the drawings, Figure 1 represents a front elevation of my improved elevator and grain receiving and transferring apparatus with portions of the front of the hopper broken away, showing the internal construction of the same. Fig. 2 represents a vertical sectional view of the apparatus; Fig. 3, a top view of the apparatus with the top of the pneumatic tube removed; Fig. 4, a side elevation of the apparatus, showing the supports of the hopper and the counterbalancing mechanism, the hopper being in its lowest position; and Fig. 5, a similar view, showing the hopper in its highest position.

The letter A indicates a pneumatic or air tube, usually fixed near the point or place of operation, from which extend one or more hose, in the usual manner, to the point of supply, which may be the hold of a vessel, the interior of a car, or a proper receptacle for storing the grain. Said tube extends upward to a point of delivery, B, over a suitable receptacle or hopper for receiving the grain carried up through the said pneumatic tube. Beyond the point of delivery the pneumatic tube extends forward and is connected with exhaust mechanism, such as an exhaust-fan or equivalent device. The pneumatic tube from the point of supply to the point of delivery is somewhat less in transverse area than from the last point of delivery to the air-exhaust, whereby the proper pressure is exerted at the supply end of the tube to effectually elevate the grain and carry it to the point of delivery; but the most important feature of such differences of area is that the friction of the air in its passage through the enlarged area is materially lessened.

Within the pneumatic tube, near the point of delivery, is pivoted a screen composed of a series of parallel slats or wires suitably connected together, and braced to prevent sagging, and so arranged as to leave spaces between them, in order to freely allow the passage of air, but too small to permit the passage of grain. Said screen is capable of being thrown into an inclined position to prevent the passage of grain beyond the point of delivery and direct it into the hopper, or into a horizontal position over the point of delivery, so as to permit the grain to pass forward through the pneumatic tube to be delivered into a succeeding hopper.

From the horizontal portion of the pneumatic tube extends downwardly, at an angle, a branch tube, C, the lower end of which is secured to a flexible connection, C', of leather, rubber, or other similar material, attached to the upper part of a hopper, D, to be more fully hereinafter specified. The flexible connection is secured to the branch C of the pneumatic tube and to the upper part of the hopper by means of detachable rectangular frames E F, which may be disconnected at pleasure for the purposes to be hereinafter explained. Within the branch C of the pneumatic tube extends downwardly in a curved direction a chute, G, from the delivery portion of said pneumatic tube to the interior of the flexible connection C'.

The hopper is divided into two compartments, H I, by means of a vertical partition, J, said compartments communicating respectively with the chamber formed by the flexible connection by means of apertures L and M, which are provided with hinged valves O and P, adapted to be alternately opened and closed, as more fully hereinafter set forth.

At the lower end of the hopper, directly below the dividing-partition, is journaled a rock-shaft, R, provided with valves S T, set at such an angle to each other that when one is closed against the lower opening of one compartment the other will be away from the opening of the corresponding compartment, and vice versa. Said rock-shaft is provided with an upwardly-projecting arm, $A^1$, Fig. 1, carrying a segment, $A^3$, having two shoulders $a'$ $a'$, with which a vertically-sliding spring-latch, $B^1$, secured in ways $B^2$ on the hopper, is adapted to engage, said latch being operated by a stop, $B^4$, on the frame H' to catch and release the shoulders alternately, to permit the lower valves to be shifted.

Within each compartment of the hopper is located one or more bent tubes, $C^2$, extending from the lower valves to near the upper valves in such manner that upon the opening of one of the lower valves air will be admitted and drawn into the tubes in the compartment of such valve, and will be forcibly emitted from the upper end of the tube in said compartment against the valve in the upper part of the same, closing said valve automatically. This entering draft of air is caused by the vacuum in the compartment of the hopper.

The letters $c$ $c$, Fig. 2, indicate two apertures opening from the interior of the flexible connection into the branch C of the pneumatic tube, by means of which any leakage of air into the apparatus at the joints of the flexible connection will be prevented from interfering with the discharge of the grain.

The letter D' represents two angle-levers, one arranged in each compartment of the hopper, and connected with the respective upper valves of the said compartments. Said levers are provided with rods E', extending downward, and of such length as to abut against the inner valves. The rods are provided with adjustable conical weights $e$, which are cast hollow from the bottom to near the top, and at the top are drilled, so that they may be slipped upon the rods, and are provided with set-screws $e'$, by means of which they may be adjusted at any position upon the rods.

The object of said weights is to insure the dropping of the rods when the lower valves are opened. The object of making the weights conical is to prevent the lodgment of any grain upon them, and they should be adjusted to such a position upon the rods as to allow a free passage around their lower edges and the openings in the bottom of the hopper, to permit the free escape of grain when the valves are opened.

The said rods are loosely connected with the ends of the levers, so as to permit the levers to have an independent movement with respect to the same, and are provided with spiral springs F, which gradually yield as the respective valves are closed until the tension is overcome, when they operate the levers to open the upper or induction valve.

The hopper is supported in a suitable frame, H', upon the beams or levers I' (fulcrumed in the frame H') by means of vertical beams L', secured to the hopper, the upper ends of the same being pivoted to the said beams or levers I' at their forward ends.

Upon the upper and lower ends of said beams I' are fulcrumed the levers M' N', which have pivoted to their ends the bars O', the opposite ends of which are pivoted to the frame H', by means of which the hopper is held and allowed to move in a strictly vertical plane.

The rear ends of the beams or levers I' are provided with a loose hanging shelf, P', adapted to receive and hold a series of movable weights or counterpoises, R', by means of which the hopper and its contents are counterbalanced.

The supply end of the pneumatic tube may be provided with a series of flexible branch tubes, A², by means of which the grain may be taken from one or more points at the same time; and one or more delivery-points may be located in the tube, so that the grain may be delivered to one or more places by throwing the inclined screen into a horizontal position, which will permit the grain to pass forward in the tube.

To prevent the expense of a series of hoppers, one for each point of delivery, the flexible connection is made removable, so that the hopper may be detached and transported to the succeeding point of delivery, and readily connected with the pneumatic tube, the delivery branches of the tube which are not connected with the hoppers being provided with suitable devices for closing the same to prevent the entrance of air.

In case a series of hoppers are employed, such closing devices will be unnecessary, as the hoppers with their valves will prevent the entrance of air to the tube.

What I claim is—

1. In a grain-elevator, a pneumatic tube extending from the point of supply to the point of delivery, having a suitable screen pivoted over the same, and connected with a suitable air-exhausting apparatus, whereby the pressure may be relieved from above the grain and the same be elevated by atmospheric pressure to one or more points of delivery, substantially as specified.

2. In combination with the pneumatic tube, a hopper having two compartments and connected to the tube at its delivery-point by means of a flexible connection, the said compartments being provided with suitable valves and mechanism for operating the same, whereby the grain may be alternately received and transferred to a point desired, substantially as specified.

3. The combination, with the pneumatic conveying-tube and the receiving-hopper, of an adjustable screen, whereby the grain may be delivered to said hopper, or directed to one or more additional hoppers, substantially as specified.

4. In combination with the grain-receiving hopper and the upper and lower alternately-acting valves, one or more air-tubes in each compartment, adapted to admit and discharge a current of air alternately against the upper valves in the respective compartments, whereby the induction-valve in each compartment will be closed as the eduction-valve is opened, substantially as specified.

5. In combination with the upper and lower alternately-acting valves for admitting grain to the respective compartments of the hoppers, the levers operated by the lower valves to automatically open the upper valves and admit the grain to each compartment, substantially as specified.

6. In combination with a grain-conveying pneumatic tube, a rising-and-falling hopper, and an air-tight flexible connection between said tube and hopper, and devices for latching and unlatching, or opening and closing, a valve or valves of said hopper, said devices being operated or permitted to operate by the rising and falling of the hopper, substantially as specified.

7. In combination with the hopper, a pneumatic tube, the transverse area of which from the point of delivery to the exhaust is larger than from the point of supply to the point of delivery, whereby the friction of the air through the enlarged area is lessened.

8. In combination with a pneumatic tube for transferring and delivering grain, one or more hoppers connected with said tube by a flexible connection, whereby the hopper is permitted to rise and fall without destroying the vacuum, substantially as set forth.

In testimony that I claim the foregoing I have hereunto set my hand in the presence of the subscribing witnesses.

JOHN B. STONER.

Witnesses:
JAMES L. NORRIS,
JAS. A. RUTHERFORD.